United States Patent
Miller et al.

(10) Patent No.: US 11,148,370 B2
(45) Date of Patent: Oct. 19, 2021

(54) METHOD OF MAKING A TUBE AND TUBE

(71) Applicant: Colgate-Palmolive Company, New York, NY (US)

(72) Inventors: Christopher Miller, Flemington, NJ (US); Derek Samaroo, Edison, NJ (US); Kowsilla Pillay, Hillsborough, NJ (US)

(73) Assignee: Colgate-Palmolive Company, New York, NY (US)

( * ) Notice: Subject to any disclaimer, the term of this patent is extended or adjusted under 35 U.S.C. 154(b) by 535 days.

(21) Appl. No.: 15/521,425

(22) PCT Filed: Oct. 24, 2014

(86) PCT No.: PCT/US2014/062261
§ 371 (c)(1),
(2) Date: Apr. 24, 2017

(87) PCT Pub. No.: WO2016/064427
PCT Pub. Date: Apr. 28, 2016

(65) Prior Publication Data
US 2017/0312994 A1     Nov. 2, 2017

(51) Int. Cl.
*B32B 7/05*     (2019.01)
*B32B 27/08*     (2006.01)
(Continued)

(52) U.S. Cl.
CPC ........ *B29C 66/7234* (2013.01); *B29C 53/382* (2013.01); *B29C 65/02* (2013.01); *B29C 66/118* (2013.01); *B29C 66/4322* (2013.01); *B29C 69/001* (2013.01); *B29D 23/20* (2013.01); *B32B 1/08* (2013.01); *B32B 3/263* (2013.01);
(Continued)

(58) Field of Classification Search
CPC .... B65D 35/00; B65D 35/08; B29C 66/7234; B29C 53/382; B29C 69/001; B32B 2555/00; B32B 37/22; B32B 7/12; B32B 3/263; B32B 27/34; B32B 27/36; B32B 27/32; B32B 27/308; B32B 27/306;
(Continued)

(56) References Cited

U.S. PATENT DOCUMENTS 2,176,109 A * 10/1939 Ratay ..................... B29D 23/20
                                                                  138/128
2,605,018 A * 7/1952 Croce ................... B29D 23/20
                                                                  222/107

(Continued)

FOREIGN PATENT DOCUMENTS

| CN | 1324318 A | 11/2001 |
| CN | 201272536 Y | 7/2009 |
| CN | 202278800 U | 6/2012 |

OTHER PUBLICATIONS

International Search Report and the Written Opinion of the International Searching Authority issued in International Application PCT/US2014/062261 dated Jun. 23, 2015.

*Primary Examiner* — J. Gregory Pickett
*Assistant Examiner* — Jenine Pagan

(57) ABSTRACT

A method of making a tube (60) includes forming at least one tube layer (101, 106, 108); and forming at least one film layer (102, 103, 104) on the at least one tube layer, wherein the at least a portion of the at least one film layer does not completely overlap the at least one tube layer.

21 Claims, 5 Drawing Sheets

(51) Int. Cl.
| | |
|---|---|
| *B32B 1/08* | (2006.01) |
| *B65D 35/08* | (2006.01) |
| *B29D 23/20* | (2006.01) |
| *B32B 37/22* | (2006.01) |
| *B32B 15/08* | (2006.01) |
| *B32B 7/12* | (2006.01) |
| *B32B 3/26* | (2006.01) |
| *B32B 27/34* | (2006.01) |
| *B32B 27/36* | (2006.01) |
| *B32B 27/32* | (2006.01) |
| *B32B 27/30* | (2006.01) |
| *B29C 53/38* | (2006.01) |
| *B29C 69/00* | (2006.01) |
| *B29L 23/20* | (2006.01) |
| *B29C 65/00* | (2006.01) |
| *B29C 65/02* | (2006.01) |
| *B32B 15/20* | (2006.01) |
| *B32B 38/00* | (2006.01) |
| *B29C 53/40* | (2006.01) |
| *B29L 31/00* | (2006.01) |

(52) U.S. Cl.
CPC ............ *B32B 7/05* (2019.01); *B32B 7/12* (2013.01); *B32B 15/08* (2013.01); *B32B 15/20* (2013.01); *B32B 27/08* (2013.01); *B32B 27/306* (2013.01); *B32B 27/308* (2013.01); *B32B 27/32* (2013.01); *B32B 27/34* (2013.01); *B32B 27/36* (2013.01); *B32B 37/22* (2013.01); *B32B 38/0004* (2013.01); *B65D 35/08* (2013.01); *B29C 53/40* (2013.01); *B29C 66/0242* (2013.01); *B29K 2995/0067* (2013.01); *B29L 2023/20* (2013.01); *B29L 2031/712* (2013.01); *B32B 2307/58* (2013.01); *B32B 2307/7242* (2013.01); *B32B 2307/7248* (2013.01); *B32B 2439/00* (2013.01); *B32B 2439/70* (2013.01); *B32B 2555/00* (2013.01); *B32B 2597/00* (2013.01)

(58) Field of Classification Search
CPC .. B32B 7/05; B32B 27/08; B32B 1/08; B29D 23/20; B29L 2023/20
USPC ................................ 206/524.2, 277; 222/92
See application file for complete search history.

(56) References Cited

U.S. PATENT DOCUMENTS

| | | | |
|---|---|---|---|
| 3,307,738 A | | 3/1967 | Christian |
| 3,660,194 A | * | 5/1972 | Hoffmann ............ B29C 53/382 156/191 |
| 3,948,704 A | * | 4/1976 | Evans .................. B29C 31/002 156/69 |
| 3,976,224 A | * | 8/1976 | Ericson ................. B65D 35/02 222/107 |
| 4,226,337 A | * | 10/1980 | Abbott ................... B29C 53/50 222/107 |
| 4,613,536 A | * | 9/1986 | Makilaakso ........... B32B 27/06 428/124 |
| 4,733,800 A | * | 3/1988 | Bjorkengren ........ B29C 53/382 138/138 |
| 5,162,066 A | | 11/1992 | Martensson et al. |
| 6,884,206 B2 | * | 4/2005 | Lasson ................... B32B 38/04 493/210 |
| 2009/0324864 A1 | | 12/2009 | Miller et al. |
| 2012/0205267 A1 | * | 8/2012 | Maurice ................ B29C 53/38 206/277 |
| 2014/0014271 A1 | * | 1/2014 | Weber .................... B29C 53/50 156/475 |
| 2017/0057684 A1 | * | 3/2017 | Kisielinski ............. B32B 15/08 |
| 2017/0349334 A1 | * | 12/2017 | Kleyman ............... B65D 35/28 |

* cited by examiner

METHOD OF MAKING A TUBE AND TUBE

Cross-Reference to Related Applications

This application is the U.S. National Stage application for PCT application serial no. PCT/US2014/062261, filed on Oct. 24, 2014, the disclosure of which is incorporated herein by reference.

BACKGROUND

Embodiments described herein relate to film barrier liners for tube packaging. In addition embodiments described herein relate to continuous methods for making tubes with a barrier.

Tube containers, such as dispensing tubes, are used to hold and to dispense a wide range of products. These include adhesives, lubricants, lotions, medicants, shampoos, hair dressings, and various oral care products. Some of the lotions, medicants and oral care products contain an antibacterial compound. A problem with such products is that the antibacterial compound may be absorbed or otherwise degraded by the tube materials. The result is that the tube structure needs to be modified to reduce or to eliminate the absorption by the tube structure for the antibacterial compound. In many cases, and especially for oral care products such as toothpaste, it is desirable also to reduce the absorption by the tube structure for other contained substances such as flavors and fragrances. Some package materials absorb flavor and fragrance components in an undesirable ratio depending on the flavor and fragrance molecules. Thus the flavor or fragrance changed. This problem needs to be solved for flavors and fragrances to preserve the taste and olfactory properties of the products.

A tube container may include a tube body, a tube shoulder and a nozzle that may extend from the shoulder, and a closure. The absorption of product components by the tube body can be minimized by the use of a tube laminate structure that includes a barrier such as a metal foil or a plastic film. Traditionally, barrier materials have been used to reduce the loss of flavors or fragrances, and in some instances antibacterial compounds. It is widely believed in the industry that a good barrier to flavors and to fragrances is also a good barrier to antibacterial compounds, and that barrier improvement would be similar for all of these organic compounds. The barrier layer is normally selected based on the flavor or fragrance barrier properties. However, the use of barrier layers requires additional manufacturing steps which add to cost. For example, sealing of tubes can be a challenge when a barrier layer is present and additional manufacturing steps are required in such cases.

Accordingly, there is a need for a tube with a barrier layer and manufacturing method for making such a tube that allow for overcoming the challenges of conventional manufacturing methods.

BRIEF SUMMARY

In an embodiment, there is a method of making a tube. The method includes forming at least one tube layer; and forming at least one film layer on the at least one tube layer, wherein the at least a portion of the at least one film layer does not completely overlap the at least one tube layer.

In another embodiment there is a tube structure for packaging products. The tube structure includes a tube body and a tube shoulder disposed on a shoulder-end of the tube body. The tube body may include at least one tube layer, and at least one film layer disposed on the at least one tube layer. At least a portion of the at least one film layer may not completely overlap the at least one tube layer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiments is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

Described herein are a tube that includes a barrier layer, for example, a spot barrier layer that has sealing properties, and a method for making such a tube. In an embodiment, the method provides for applying the barrier layer to a tube laminate. The addition of such a barrier layer improves the barrier properties of a package for flavor and product ingredient retention. Accordingly, the barrier material is added to an inner surface of a tube to minimize flavor loss. In a method of making, the barrier material is not located in an area of the tube, such as a laminated tube, that is used for forming a seal area, and/or seal areas of the tube.

Figure 1:
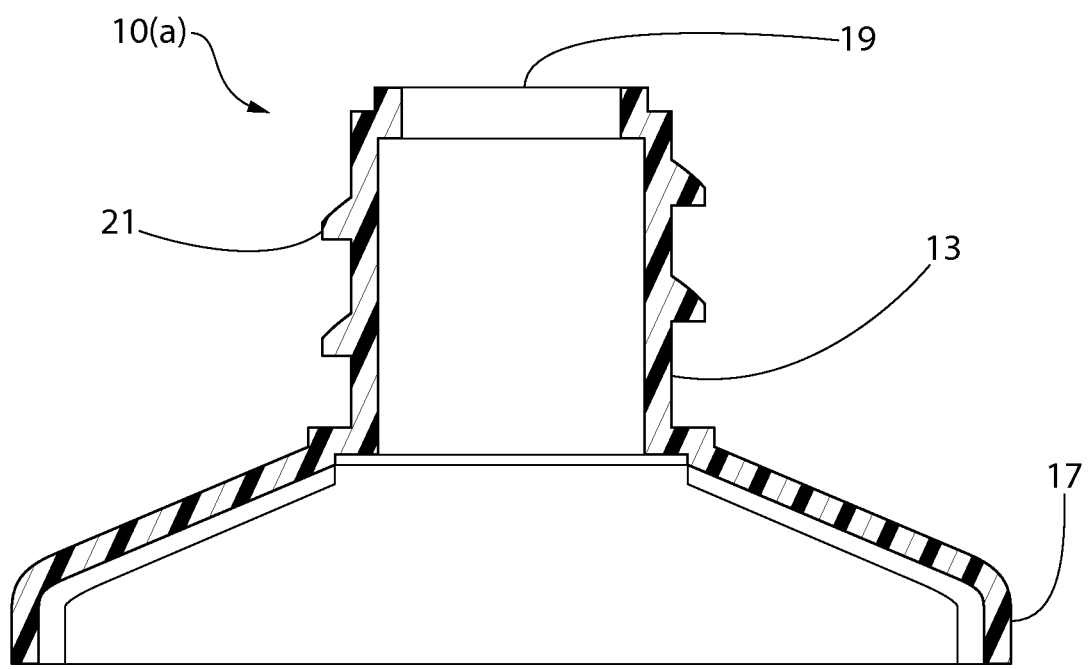
FIG. 1 is a cross-section of a shoulder of a tube with a nozzle extending from the shoulder.

FIG. 1 shows tube shoulder portion 10(a) comprising a nozzle 13 and the shoulder 17, with the nozzle extending from the shoulder. The nozzle has an aperture 19 and threads 21 for the attachment of a closure (not shown), such as a cap, which can be threaded onto the threads 21. An embodiment of a shoulder portion 10(a) is described in US 2009/0324864 which was filed on Dec. 31, 2009 and is hereby incorporated by reference herein in its entirety.

Figure 2:
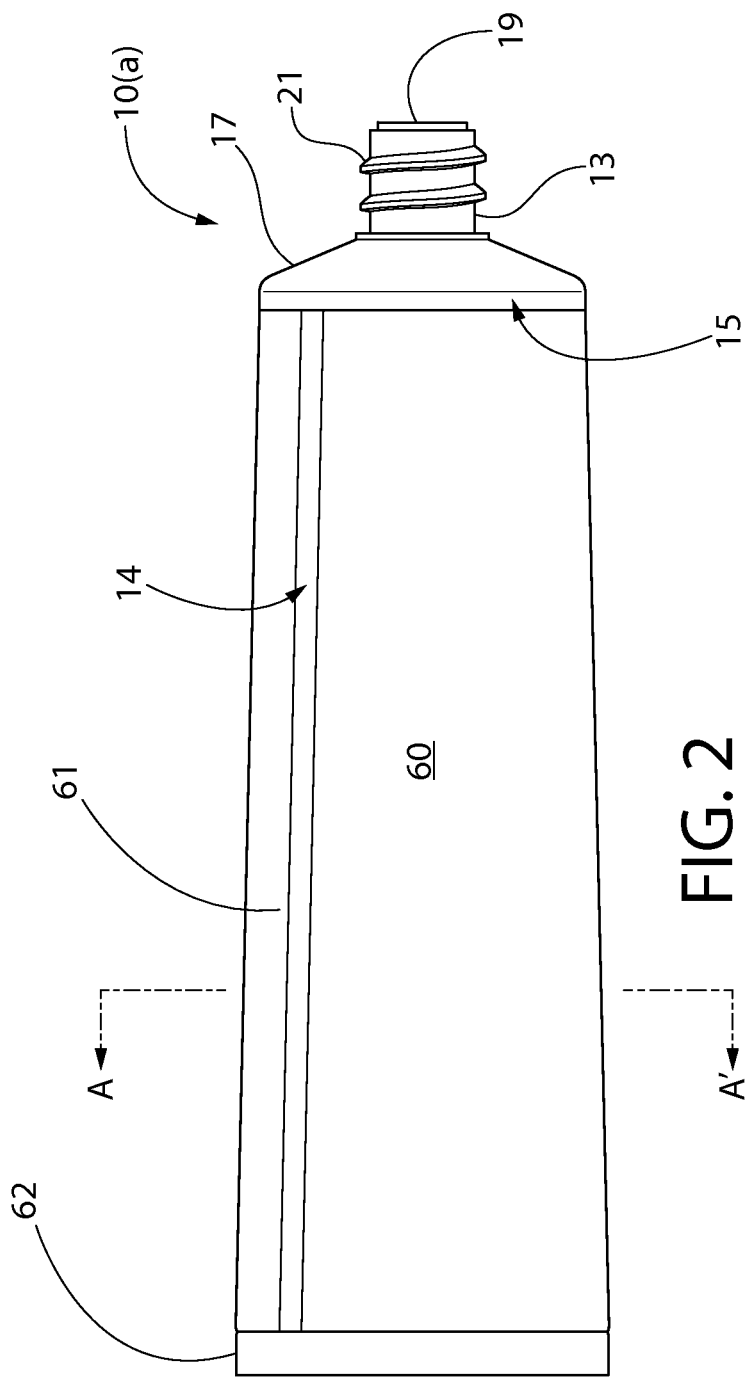
FIG. 2 is a side view of a tube, including the shoulder and nozzle extending from the nozzle, for example, of FIG. 1.

FIG. 2 shows a tube 60 that includes a tube body 61 and shoulder portion 10(a) bonded onto tube body 61. The tube 60 may include a side seal 14, a tube shoulder seal 15 and an end seal 62. In an embodiment, tube 60 may be a tube structure for packaging products. Additional details of tube 60 and a method of making such a tube are described below and shown in FIGS. 3-7. Products that may be packaged in the tube 60 having the structure described herein may include dentifrices, and other oral care products, personal care products, and food products.

The tube body 61 may be formed from at least one layer such as in a laminate structure. The laminate structure may be a foil-based laminate structure may include the following configuration of layers: polyethylene (PE) film/coextruded tie layer/aluminum foil/coextruded tie layer/polyethylene coextruded film. In such a foil-based laminate structure, each of the coextruded tie layers may include the following configuration of layers: polyethylene/ethylene acrylic acid (EAA), with the EAA layer side of each tie layer bonded to the aluminum foil layer. Alternatively, the laminate structure may be an all-plastic laminate structure and may include the following configuration of layers: polyethylene film/extruded tie Layer/coextruded film/extruded tie layer/polyethylene coextruded film. In such an all-plastic laminate structure, the interdisposed coextruded film may include the following configuration of coextruded layers: modified PE/ethylene vinyl alcohol (EVOH)/modified PE; and each of the extruded tie layers may have the following structure: PE/PE.

Figure 3:
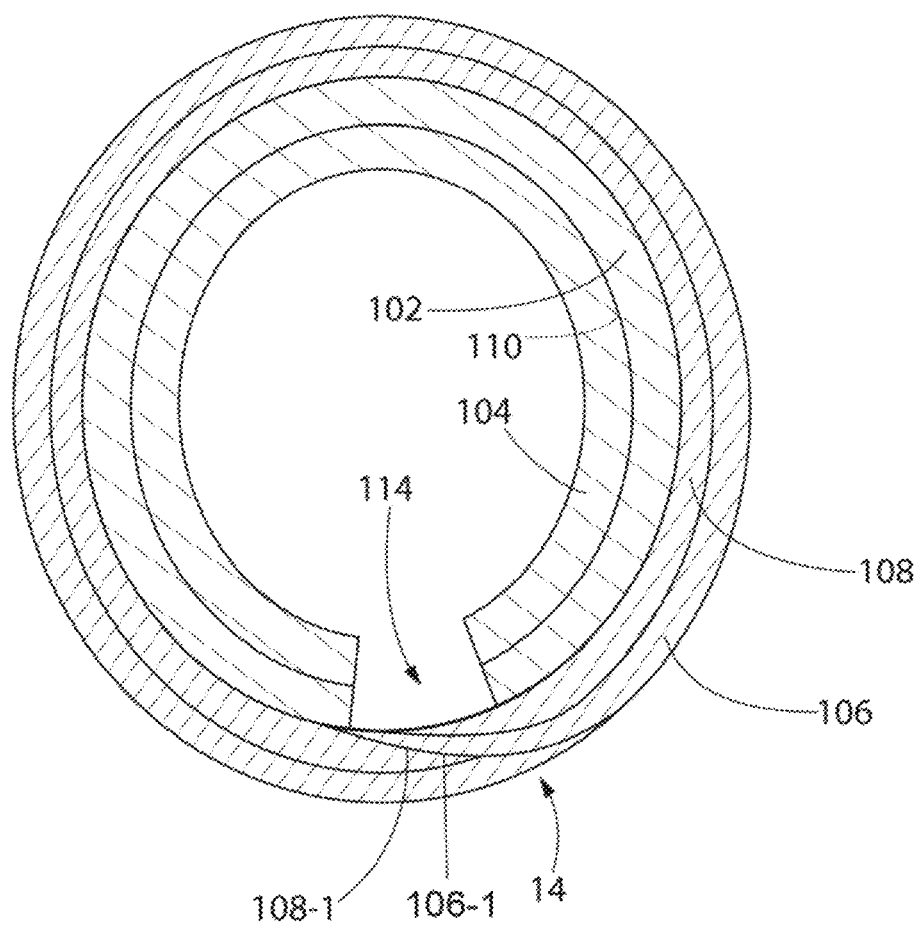
FIG. 3 is a cross-section of the tube taken along A-A' of FIG. 2 and showing the tube's tube laminate and film laminate bonded together.

As shown in FIG. 3, which is a cross-sectional view according to A-A' of FIG. 2, the tube body 61 may include at least one tube layer. The at least one tube layer may be more than one tube layer, and may formed as a tube laminate such as tube laminate 101. Tube laminate 101 may include an inner tube layer, such as first tube layer 108, and an outer tube layer, such as second tube layer 106. In an embodiment, the tube laminate 101 may have a thickness in the range of about 140 micron to about 350 micron. Tube body 61 may also include at least one film layer. The at least one film layer may include a barrier material. The at least one film layer may be more than one film layer, and may be formed as a film laminate, such as film laminate 103. Film laminate 103 may include a barrier layer 104 and a polymer layer 102, as further described below and shown in FIGS. 4A-4B and FIGS. 5-7. In an embodiment, the film laminate 103 may have a thickness in the range of about 10 micron to about 100 micron. The polymer layer 102 may be bonded to the first (inner) tube layer 108.

Figure 4A:
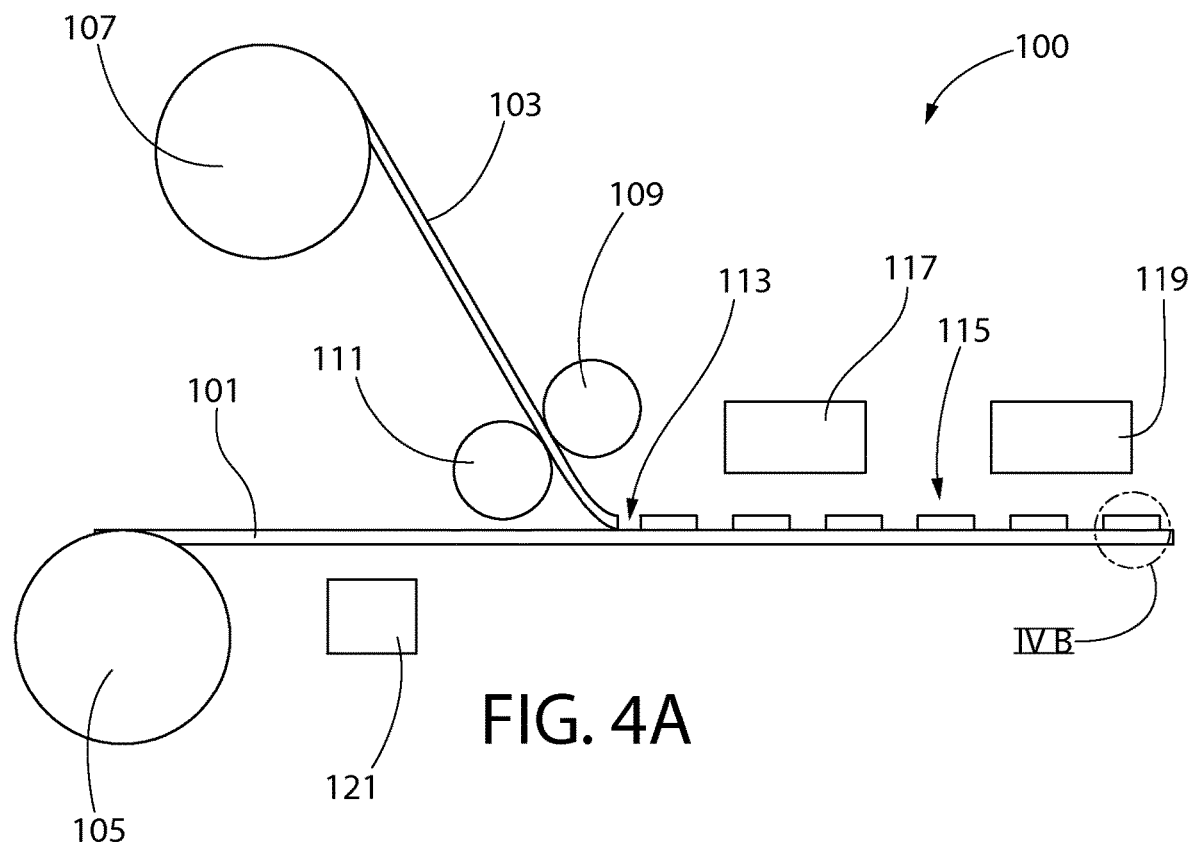
FIG. 4A illustrates a general process for making a tube, specifically for forming the tube laminate and film laminate.
Figure 4B:
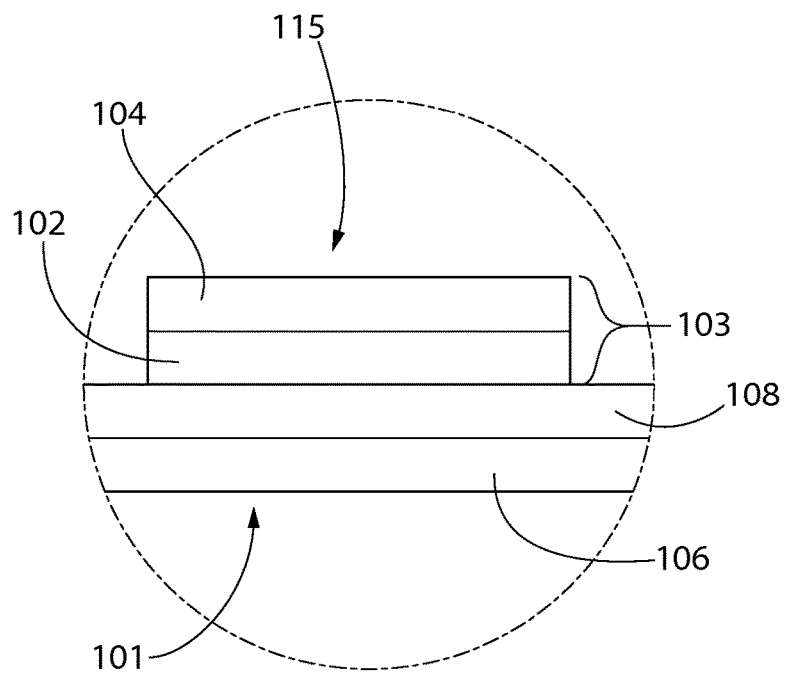
FIG. 4B is a magnified view of inset IV-B of FIG. 4A.

For the tube laminate, the first tube layer 108 may bonded to second tube layer 106 directly, as shown in FIG. 3 and FIG. 4B, in a configuration such that no inter-disposed layers are formed between them. The first tube layer 108 may bonded to second tube layer 106 indirectly (not shown) via lamination with other inter-disposed layers, such as a tie layer, disposed between the first tube layer 108 and second tube layer 106. First tube layer 108 and second tube layer 106 may be provided as an already-laminated film but may be formed independently and bonded together via casting, such as extrusion die layers bonded over a chill roller.

A side seal portion 114, corresponding to the location where side seal 14 of FIG. 2 is formed, may extend along a length of tube body 61. Side seal portion 114 may include a surface 108-1 of the first tube layer 108 bonded to a surface 106-1 of the second tube layer 106. In an embodiment, no portion of the barrier layer may be disposed at the locations along side seal 14. For example, the barrier layer formed along the inner surface of tube body 61 may not extend into seal portion 114. In an embodiment, only the polymer layer 102 of film laminate 103, and not barrier layer 104, may be disposed in the side seal portion 114.

As described further below, a surface of the tube shoulder portion 10(a) may be bonded to a surface of the first tube layer 108 to form the tube shoulder seal 15. The barrier layer may also not extend to the tube shoulder seal 15. For example, no barrier layer material may be disposed between the surfaces of the tube shoulder portion 10(a) and the first tube layer 108 at the tube shoulder seal 15. Similarly, no portion of barrier layer may extend to the end-seal 62. For example, no barrier layer material may be disposed in the end-seal 62. In other words, end seal 62 may include a first surface of the inner layer (such as a first portion of an inner surface of first tube layer 108) bonded to a second surface of the inner tube layer (such as another portion of an inner surface of first tube layer 108). In an example, end seal can be formed thermally via heat sealing, mechanically, such as via pressure forming or crimping, ultrasonically such as ultrasonic welding, or a combination thereof.

Barrier layer 104 may have a thickness of about 10 microns to about 30 microns. Barrier layer 104 may be formed of a material selected from the group consisting of polyethylene terephthalate polymers, polyethylene naphthalate polymers, polytrimethyl naphthalate polymers, ethylene vinyl alcohol copolymers, acrylonitrile methyl-acrylate copolymers, such as those made from resins sold under the BAREX® brand (available from Ineos Barrex of Switzerland), polylactic acid polymers, polyethylene terephthalate (PET-P), and polyamide polymers.

Polymer layer 102 may have a thickness of about 5 microns to about 50 microns. Polymer layer 102 may be formed of polyethylene, polypropylene, and the like.

A tie layer may 110 be formed between barrier layer 104 and polymer layer 102, and may be a polymer or an adhesive that adheres to the polymer layer 102 and to the barrier layer 104. The tie layer 110 may have a thickness of about 5 micron to about 20 micron. Various polymers are useful as the tie layer. These include ethylene/vinylacetate copolymers, ethylene methyl acrylate copolymers, ethylene butyl acrylate copolymers, ethylene/acrylic ester/maleic anhydride terpolymers, and ethylene/vinyl acetate/maleic anhydride terpolymers. Tie layers may be commercially available tie layers.

First tube layer 108 of tube laminate 101 may have a thickness of about 40 to about 150 microns and may be formed of polyethylene, polypropylene with aluminum, nylon, and the like. At least the inner surface of first tube layer 108 may be the same material as the outer surface of polymer layer 102, and all of inner surface of first tube layer 108 may be the same material as outer surface of polymer layer 102.

Second tube layer 106 of tube laminate 101 may have a thickness of about 100 to about 200 and may be formed of the same materials as those of the first tube layer 108.

The tube 60 may be manufactured according to methods embodied in the processes illustrated in FIGS. 4A-4B and FIGS. 5-7 which are described below. For example, as shown in FIGS. 4A-4B, one such method may include forming a tube laminate 101, forming a film laminate 103, and cutting the film laminate 103 into at least one film laminate section 115. Film laminate section 115 may be formed on tube laminate 101 and spaced apart from other ones of film laminate sections by space 113, which may include gaps of various lengths, such as, but not limited to, about 11 mm gaps. Film laminate section 115 may be bonded to tube laminate 101 by heating and/or providing pressure from a heat and/or pressure source 117, followed by cooling and/or providing pressure from a cooling and/or pressure source 119. In FIG. 4A, heat and/or pressure sources 117 and 119 are shown in a specific arrangement, but the embodiments are not so limited. For example, either one of heat and/or pressure source 117 or cooling and/or pressure source 119 may be disposed at different locations than what is shown in FIG. 4A. In an embodiment, 117 or 119 may be placed at locations that coincide with bonding of film laminate section 115, for example, just as film laminate section 115 is first delivered onto tube laminate 101. Additionally, a pre-heat station may be provided to pre-heat film-laminate sections 115 prior to placement on tube laminate 101. For example, a pre-heat station may pre-heat film laminate 103.

The tube laminate 101 may be formed from the first tube layer 108 and the second tube layer 106. The first tube layer 108 may be disposed on the second tube layer 106. For example, the first tube layer 108 may be bonded to second tube layer 106 directly (as in inset IV-B illustrated in FIG. 4B) such that no inter-disposed layers are formed between them. Alternatively, first tube layer may be bonded to second tube layer 106 indirectly (not shown) via lamination with other inter-disposed layers bonded between the first tube layer 108 and second tube layer 106.

The film laminate 103 may be formed from the barrier layer 104 and the polymer layer 102. The barrier layer 104 may be disposed on the polymer layer 102. For example, the barrier layer 104 may be bonded directly to polymer layer 102 (as in inset IV-B illustrated in FIG. 4B), such that no inter-disposed layers are formed between them. Alternatively, the barrier layer 104 may be bonded indirectly to the polymer layer (indirect bonding not shown), for example, via lamination with other inter-disposed layers bonded between the barrier layer 104 and polymer layer 102. For example, a tie layer (not shown) may be formed between the barrier layer 104 and the polymer layer 102.

Additionally, as illustrated in the close-up of inset "IV-B" view of FIG. 4B, the polymer layer 102 may be bonded to the first tube layer 108 of the tube laminate 101 in the at least one film laminate section 115. For example, as shown in FIG. 4A, tube laminate 101 may be unrolled as a sheet from a roll 105. Film laminate 103 may be unrolled as a sheet from a roll 107, for example, prior to being cut into film laminate sections 115 and bonded onto tube laminate 101. Feeders 111 and 109 may be used to unroll film laminate 103 from roll 107. Feeder 109 may include a cutter (not shown) for cutting the film laminate into film laminate section 115. A pre-heat station, as described above, may be incorporated in feeders 109 and/or 111. In an embodiment, film laminate sections 115 may be formed onto tube laminate 101 and spaced apart from other ones of laminate sections as shown by space 113. In other words, the film laminate sections 115 may not completely overlap the tube laminate 101 such that areas of tube laminate 101 not covered by at least part of film laminate sections 115 may later comprise portions of seals, such as end seal 62, side seal 14 and/or tube shoulder seal 15 of tube 60 described above, where no portion of barrier layer is present.

An automated system may control the rate at which tube laminate 101 is unrolled from roll 105 and the rate at which film laminate 103 is unrolled from roll 107. An eye-mark (not shown), applied at predetermined locations on a surface of the second tube layer 106, may be detected by an imager 121, such as an optical detector, connected to a controller (not shown), such as a computer. As unrolled sheets of tube laminate 101 and film laminate 103 are advanced, imager 121 may be configured to detect the eye mark on the tube laminate 101 and to communicate with the controller. In turn, the controller may activate cutter 109 to cut film laminate 103 into film laminate sections 115. In other words, the at least one film laminate section 115 may be registered with respect to the location of a respective one of the plurality of eye-marks printed on the tube laminate. Accordingly, a distance between ends of the film laminate section 115, such as between adjacent edge surfaces of subsequently cut sections 115 formed while cutting film laminate into smaller sections, may be controlled such that it is less than a distance of a first one and a second one of the at least one of an eye-mark. Additionally, a dimension of laminate film 103 may be less than a corresponding dimension of tube laminate 101 such that upon forming film laminate section 115 onto the tube laminate 101 additional surface portions of tube laminate 101 remain exposed (for example, surface portions of first tube layer 108 that are not covered by film laminate). Accordingly, surface portions of tube laminate remain exposed and uncovered by barrier layer 104.

The polymer layer 102 of film laminate section 115 may be bonded to first tube layer 108 of tube laminate 101 by heating and/or providing pressure from a heat and/or pressure source 117, and may be followed by cooling and/or providing pressure from a cooling and/or pressure source 119 to form a unified tube body laminate. After bonding of film laminate section 115 to tube laminate 101, the combined tube body laminate may be sectioned, such as via cutting, to form individual sections that can then be formed into individual ones of tube body 61.

Figure 5:
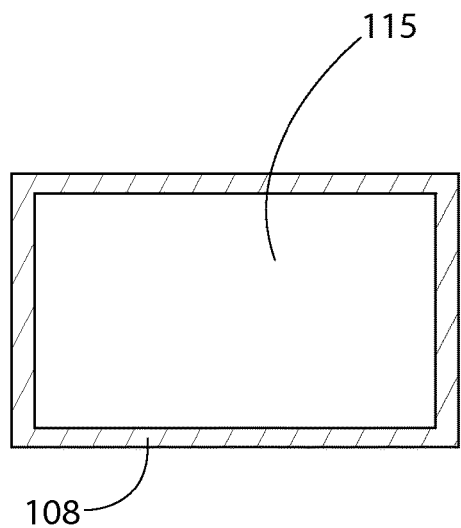
FIGS. 5-7 illustrate a method of forming a tube body, for example from the tube laminate and film laminate that are bonded together in the process illustrated in FIG. 4.
Figure 6:
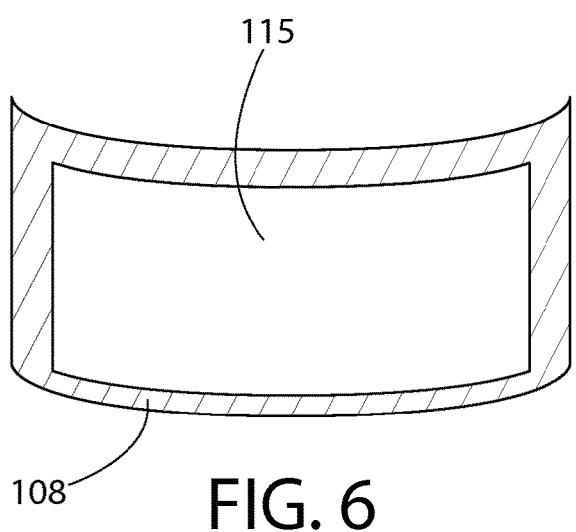
Figure 7:
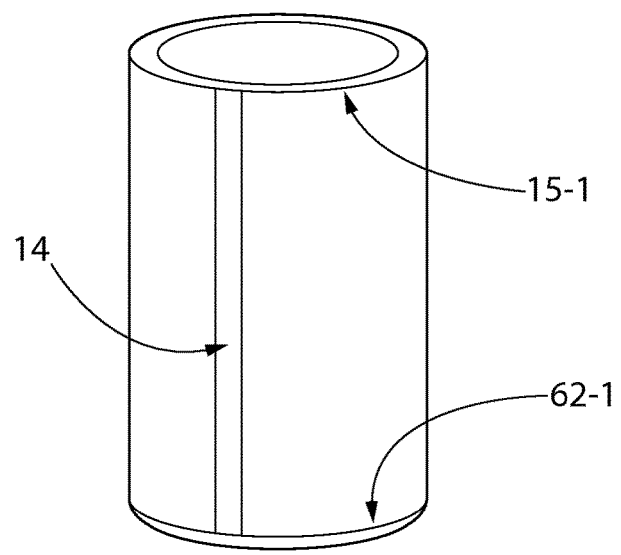

For example, after the film laminate sections 115 are bonded onto tube laminate 101, such as via bonding of polymer layer 102 of the film laminate section 115 to the first tube layer 108 of the tube laminate 101, the combined laminates may be formed into individual ones of tube body 61 as shown in FIGS. 5-7. Starting with FIG. 5 an individual section of tube body laminate is shown with portions of first tube layer 108 exposed because film laminate section 115 may be formed so as not to completely cover the section of tube laminate 101 on which it is formed. For example, top and bottom exposed gaps, such as but not limited to top and bottom portions having 3 mm gaps of exposed first tube layer 108, may be provided at top and bottom portions of the individual section of tube body laminate. Additionally, side exposed gaps, such as but not limited to left and right portions having 8 mm and 3 mm gaps of exposed first tube layer 108, respectively, may be provided at left and right portions of the individual section of tube body laminate. It is noted that the left and right portions of exposed first tube layer 108 may result from formation of the gap 113 as space is provided between laminate sections 115 as they are deposited as shown in FIG. 4A. Meanwhile, the top and bottom gaps may result from providing a film laminate 103 having a width that is less than a width of the tube laminate 103. In an embodiment, the tube laminate 101 may be manipulated by overlapping first and second ends thereof, such as the ends formed during the cutting step in the process shown in FIG. 4. For example, tube body 61 may be formed by overlapping a first surface of the first tube layer 108 with a surface of the second tube layer at a location comprising side seal 14. Such overlapped ends of the tube laminate may be bonded to form the side seal 14 of the tube body. Additionally, a second surface of the first tube layer 108 may be overlapped with a third surface of the first tube layer at a location 62-1 and bonded to form end seal 62 such as after a step of filling the tube with product. The side seal 14 and end seal 62 may have widths of between about 1.5 mm to about 2.5 mm, although the width of the side seal may be different than the width of the end seal. The side seal 14 may have a surface area that is different than a surface area of the end seal 62. The resulting tube body may comprise surface-area to volume ratio in the range of about 1:1 to about 1:10.

The shoulder end 15-1 of FIG. 7 may comprise an open end of the tube body to which a shoulder portion, such as shoulder portion 10(*a*) may be bonded, such as shown in FIG. 2. In other words, a shoulder portion may be attached to the tube body of FIG. 7 by bonding a shoulder portion 10(*a*) to a surface, such as an inner surface of first tube layer 108 to form a shoulder seal 15. Shoulder seal may have a width of about 1.5 mm to about 2.5 mm. The side seal 14, end seal 62 and/or shoulder seal 15 may have same widths as one another, or at least one of the other, or may have widths that are different than one another, or different than at least one of the other. The side seal 14, end seal 62 and/or shoulder seal 15 may have the same surface area as one another, or at least one of the other, or may have surface areas that are different than one another, or different than at least one of the other.

As described above, no barrier layer material may be disposed between the bonded surfaces of the first tube layer and the second tube layer at the side seal. Additionally, no barrier layer material may be disposed between the bonded surfaces of the first tube layer, such as the second surface and the third surface thereof, at the end seam. Furthermore, no barrier layer material of the film laminate may be disposed between the first tube layer and the shoulder portion 10(*a*), such as at the shoulder seal 15. With no barrier material located at the seals, a tube formed according the embodiments will have seals of appropriate strength to withstand burst testing at appropriate conditions.

While the present teachings have been illustrated with respect to one or more implementations, alterations and/or modifications may be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages may be added or existing structural components and/or processing stages may be removed or modified. Further, one or more of the acts depicted herein may be carried out in one or more separate acts and/or phases.

Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated embodiment.

Additionally, terms of relative position as used in this application are defined based on a plane parallel to the conventional plane or working surface of a workpiece, regardless of the orientation of the workpiece. Terms such as "on," "side" (as in "sidewall"), "higher," "lower," "over," "top," and "under" are defined with respect to the conventional plane or working surface being on the top surface of the workpiece, regardless of the orientation of the workpiece.

Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method of making a tube, comprising:
   forming at least one tube layer, wherein the at least one tube layer comprises a tube laminate comprising a first tube layer and a second tube layer;
   forming at least one film layer on the at least one tube layer, wherein the at least one film layer comprises a film laminate comprising a barrier layer and a polymer layer; and
   manipulating the tube laminate by overlapping a first end of the tube laminate and a second end of the tube laminate to form a tube body, wherein overlapped portions of the first end and the second end of the tube laminate comprise a side seam of the tube body;
   wherein the at least a portion of the at least one film layer does not completely overlap the at least one tube layer at the side seal.

2. The method of claim 1, wherein the method further comprises:
   cutting the film laminate into at least one film laminate section; and
   bonding the polymer layer of the at least one film laminate section to the first tube layer of the tube laminate, wherein the film laminate section does not completely overlap the tube laminate.

3. The method of claim 2, further comprising forming a tube body by bonding a first surface of the first tube layer with a surface of the second tube layer at the side seal, and bonding a second surface of the first tube layer with a third surface of the first tube layer at an end seal.

4. The method of claim 3, wherein no barrier layer material is disposed between the bonded surfaces of at least one of (i) the first tube layer and the second tube layer at the side seal, and (ii) the second surface and the third surface of the first tube layer at the end seal.

5. The method of claim 3, wherein a surface area of the side seal is different than a surface area of the end seal.

6. The method of claim 2, wherein the tube body comprises a shoulder end comprising an open end of the tube body.

7. The method of claim 6, further comprising bonding a shoulder to a surface of the first tube layer, and wherein no barrier layer material of the film laminate is disposed between the first tube layer and the shoulder.

8. The method of claim 7, wherein the tube body comprises a surface area to volume ratio in the range of 1:1 to 1:10.

9. The method of claim 2, further comprising applying at least one eyemark at predetermined locations on a surface of the second tube layer, wherein a distance between ends of the film laminate section formed during cutting is less than a distance of a first one and a second one of the at least one eyemark.

10. The method of claim 9, further comprising registering the at least one film laminate section with respect to the location of the at least one eyemark.

11. The method of claim 2, wherein the at least one film laminate section comprises a plurality of laminate sections, and
wherein forming the film laminate comprises forming a tie layer between the barrier layer and the polymer layer.

12. The method of claim 2, wherein the film laminate has a thickness of about 10 micron to about 100 micron, the barrier layer has a thickness of about 10 micron to about 30 micron and the polymer layer has a thickness of about 5 micron to about 50 micron.

13. The method of claim 2, wherein the barrier layer of the film laminate is selected from the group consisting of polyethylene terephthalate polymers, polyethylene naphthalate polymers, polytrimethyl naphthalate polymers, ethylene vinyl alcohol copolymers, acrylonitrile methyl-acrylate copolymers, polylactic acid polymers, polyethylene terephthalate and polyamide polymers.

14. A tube structure for packaging products comprising:
a tube body and a tube shoulder disposed on a shoulder-end of the tube body, the tube body comprised of:
at least one tube layer, wherein the at least one tube layer comprises a tube laminate comprising a first tube layer and a second tube layer;
at least one film layer disposed on the at least one tube layer, wherein the at least one film layer comprises a film laminate comprising a barrier layer and a polymer layer; and
wherein a first end of the tube laminate and a second end of the tube laminate are overlapped to form the tube body, wherein overlapped portions of the first end and the second end of the tube laminate comprise a side seal of the tube body, the side seal formed of a surface of the first tube layer that is bonded to a surface of the second tube layer;
wherein at least a portion of the at least one film layer does not completely overlap the at least one tube layer at the side seal.

15. The tube structure of claim 14,
wherein the polymer layer is bonded to the first tube layer, and
wherein no portion of the barrier layer is disposed at the side seal.

16. The tube structure of claim 15, further comprising an end seal comprised of a first portion of an inner surface of the first tube layer bonded to a second portion of the inner surface of the first tube layer, and wherein no portion of the barrier layer is disposed in the end seal,
wherein a surface area of the side seal is different than a surface area of the end seal.

17. The tube structure of claim 15, wherein the barrier layer of the film laminate is selected from the group consisting of polyethylene terephthalate polymers, polyethylene naphthalate polymers, polytrimethyl naphthalate polymers, ethylene vinyl alcohol copolymers, acrylonitrile methyl-acrylate copolymers, polylactic acid polymers, polyethylene terephthalate and polyamide polymers.

18. The tube structure of claim 15, wherein the film laminate has a thickness of about 10 micron to about 100 micron, the barrier layer has a thickness of about 10 micron to about 30 micron and the polymer layer has a thickness of about 5 micron to about 50 micron.

19. The tube structure of claim 15, wherein a surface of the tube shoulder is bonded to another surface of the first tube layer to form a tube shoulder seal, wherein no barrier layer is disposed between the surface of the tube shoulder and the first tube layer at the tube shoulder seal.

20. The tube structure of claim 15, wherein the film laminate further comprises a tie layer disposed between the barrier layer and the polymer layer.

21. The tube structure of claim 14, wherein the film laminate does not completely overlap the tube laminate.

* * * * *